UNITED STATES PATENT OFFICE.

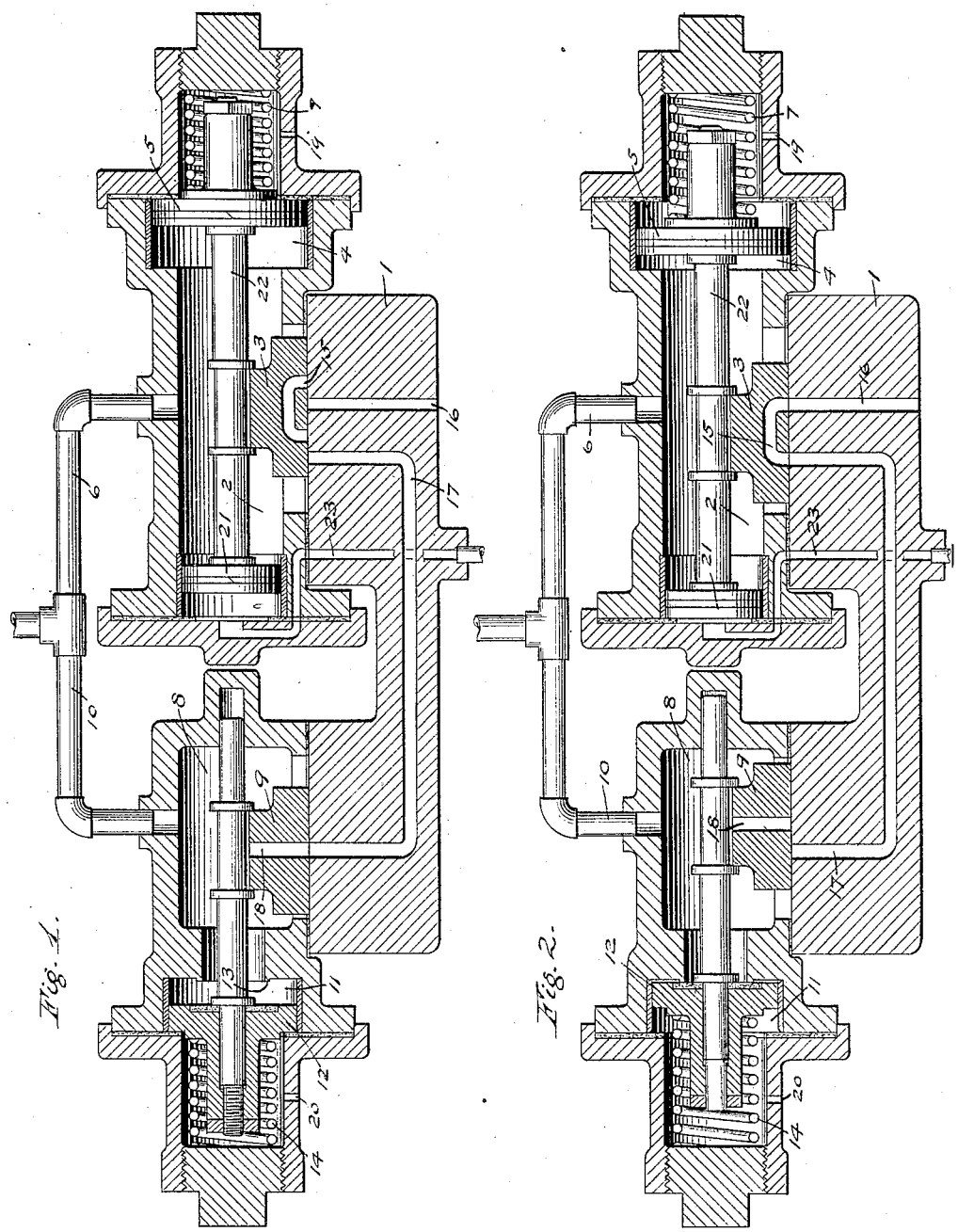

FRANK H. WHITNEY, OF MOUNT VERNON, NEW YORK, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE APPARATUS.

1,131,977. Specification of Letters Patent. Patented Mar. 16, 1915.

Application filed October 23, 1909. Serial No. 524,238.

*To all whom it may concern:*

Be it known that I, FRANK H. WHITNEY, a citizen of the United States, residing at Mount Vernon, in the county of Westchester and State of New York, have invented new and useful Improvements in Fluid-Pressure Brake Apparatus, of which the following is a specification.

This invention relates to automatic fluid pressure brakes, and more particularly to an apparatus adapted, whenever the brake pipe pressure is reduced through leakage or similar cause, to effect an application of the brakes or otherwise indicate that such leakage exists. It sometimes happens that a leakage from the brake pipe occurs which, while not sufficient to cause the movement of the triple valve piston to application position, so depletes the air pressure in the brake pipe that the brakes may fail to respond when the engineer operates the brake valve in the usual manner for the purpose of effecting an application of the brakes. In order to avoid such an occurrence, the desirability of employing apparatus of the above character is apparent.

One object of my invention is to provide an apparatus, adapted upon a predetermined reduction in brake pipe pressure from leakage, to open a communication for venting air from the brake pipe to thereby cause an application of the brakes, and means operating to prevent such venting of air from the brake pipe upon increasing the brake pipe pressure to release the brakes.

Another object of my invention is to provide, in connection with apparatus of this nature, means for limiting the reduction in brake pipe pressure produced by the apparatus to a predetermined degree.

Another object of my improvement is to provide means for preventing the operation of the apparatus upon reductions in brake pipe pressure made in the usual manner to effect an application of the brakes.

In the accompanying drawing, Figure 1 is a sectional view of a construction, embodying my improvement, and showing the parts in the position assumed when the brake system is charged to normal pressure; and Fig. 2 a similar view, showing the position assumed by the parts when the air pressure in the brake system falls below a certain point.

According to the construction shown in the drawing, I provide a casing 1 having a valve chamber 2 containing a slide valve 3 and a piston chamber 4 containing a piston 5 adapted to operate the valve 3. The valve chamber 2 is in open communication with the brake pipe through pipe 6, so that piston 5 is subject on one side to brake pipe pressure, while a spring 7 acts on the opposite side of the piston, the spring being adjusted to operate the piston 5 when the brake pipe pressure falls to a certain predetermined point, say fifty pounds. The casing 1 is also provided with a valve chamber 8, containing slide valve 9, and in communication with the brake pipe through pipe 10, and a piston chamber 11 containing a piston 12 having a seat 13, such that when the piston is seated, a reduced area of the piston is exposed to the brake pipe pressure in the valve chamber 8. A spring 14 acts on the opposite side of the piston 12 and is preferably adjusted so that a brake pipe pressure slightly greater than the pressure at which the piston 5 is operated, is required to lift the piston from its seat, for instance, the spring may be so proportioned that the piston will be moved from its seat at fifty-five pounds.

The valve 3 is provided with a cavity 15 adapted, in one position of the valve, to connect an exhaust passage 16 with a passage 17 leading to the seat of the valve 9, and the valve 9 is provided with a through port 18 adapted to register with the passage 17 and thereby connect same to chamber 8 and the brake pipe.

In operation, air being supplied to the brake pipe, upon the pressure in valve chamber 2 rising to fifty pounds, the piston 5 is shifted outwardly to the position shown in Fig. 1, closing the passage 17. When the brake pipe pressure rises to fifty-five pounds, the pressure is sufficient to lift the piston 12 from its seat and, as the full area of the piston is then exposed to brake pipe pressure, the same is quickly shifted to its outer position as shown in Fig. 1.

The parts remain in the position shown in Fig. 1 so long as the pressure in the brake pipe is maintained but if there is leakage from the brake pipe then upon the pressure falling to or slightly less than fifty pounds, the piston 5 is moved inwardly by the spring 7, and the valve 3 is shifted so as to cause the cavity 15 to connect passage 17 with the exhaust passage 16. Air is thereupon vented from the valve chamber 8 and consequently from the brake pipe thereby causing a reduction in brake pipe pressure and an application of the brakes. When the brake pipe pressure has been reduced a predetermined amount, the spring 14 shifts piston 12 to its seat, causing the valve 9 to cut off communication from the valve chamber 8 to passage 17. By this means the reduction in brake pipe pressure is limited to a predetermined amount.

The valve 9 having closed communication through the vent passage 17 by reason of the piston 12 moving to its seat, it will now be noted that in order to shift the piston 12 and move the valve 9 to its open position it is necessary to raise the brake pipe pressure to a degree somewhat higher than that necessary to move the piston 5. Thus venting of air from the brake pipe is prevented when the brake pipe pressure is increased to release the brakes, even if the valve 3 is in its open position connecting the passage 17 with the exhaust passage 16. Upon increasing the brake pipe pressure to fifty pounds the piston 5 shifts the valve 3 to cut off communication through passage 17 and when the brake pipe pressure rises to fifty-five pounds the piston 12 is actuated to move the valve 9 to its normal open position.

Another feature of my invention consists in providing means for preventing the operation of the apparatus while the brakes are applied, and for this purpose a second piston 21 is preferably connected to the opposite end of the piston stem 22 carrying the piston 5. The chamber at the outer face of this piston communicates through a passage 23 preferably with the driver brake cylinder.

It will now be apparent that when the brakes are applied, the pressure in the brake cylinder is communicated to the piston 21 through the passage 23 and this pressure acting on the piston in addition to the brake pipe pressure acting on piston 5 is sufficient to prevent the movement of the parts even when the brake pipe pressure is reduced in making applications to less than fifty pounds. The apparatus therefore does not operate under these conditions to vent air from the brake pipe.

If desired the passage 16 may be connected to a signal device, so as to operate a signal instead of causing an application of the brakes, or both a signal may be given and a reduction in brake pipe pressure effected upon movement of the parts to connect the passage 17 with the passage 16.

Having now described my invention, what I claim as new and desire to secure by Letters Patent, is:—

1. The combination with a fluid pressure brake, of an apparatus operating upon a reduction in train pipe pressure to a predetermined degree for venting air from the train pipe and means operating at a train pipe pressure less than said predetermined degree of pressure for holding the vent outlet closed.

2. The combination with a fluid pressure brake, of a mechanism operating upon reduction in brake pipe pressure by leakage for venting air from the brake pipe and means for preventing the further venting of air from the brake pipe upon the reduction in brake pipe pressure to a predetermined degree.

3. The combination with a fluid pressure brake, of a mechanism operating upon reduction in brake pipe pressure by leakage for venting air from the brake pipe and means for limiting the reduction in pressure due to the venting of air from the brake pipe to a predetermined degree.

4. The combination with a fluid pressure brake, of a valve device operating upon reduction in brake pipe pressure by leakage to a predetermined degree for opening communication for venting air from the brake pipe and a second valve device operating upon reduction in brake pipe pressure by said venting to a predetermined degree for closing said communication.

5. The combination with a fluid pressure brake, of a valve device subject to brake pipe pressure and adapted to open a communication for venting air from the brake pipe upon reduction in brake pipe pressure to a predetermined degree and means for preventing the venting of air from the brake pipe upon increasing the brake pipe pressure from a pressure less than said predetermined pressure.

6. The combination with a fluid pressure brake, of a valve device adapted upon a fall in brake pipe pressure to a predetermined degree for venting air from the brake pipe and means operating to hold the communication for venting air from the brake pipe closed in increasing the brake pipe pressure until the pressure is sufficient to operate said valve device to close said communication.

7. The combination with a fluid pressure brake, of a valve device for controlling a communication for venting air from the brake pipe and adapted to open said communication upon a predetermined fall in brake pipe pressure and means also controlling said communication and adapted at a pressure less than said predetermined pressure to close said communication and hold same closed upon increasing the brake pipe pressure to a degree exceeding said predetermined degree of pressure.

8. The combination with a fluid pressure brake, of a valve device operating upon leakage of air from the brake pipe to a predetermined degree for venting air from the brake pipe and means operating upon applying the brakes for preventing the operation of said valve device.

9. The combination with a fluid pressure brake, of a valve device adapted upon a predetermined reduction in brake pipe pressure to vent air from the brake pipe and means operated by fluid from the brake cylinder for preventing the operation of said valve device when the brakes are applied.

10. The combination with a fluid pressure brake, of a valve device adapted upon a predetermined reduction in brake pipe pressure to vent air from the brake pipe and a movable abutment subject to fluid from the brake cylinder for preventing the operation of said valve device upon applying the brakes.

11. The combination with a fluid pressure brake, of a valve device subject to brake pipe pressure and operating upon a predetermined reduction in brake pipe pressure for venting air from the brake pipe, of a movable abutment subject to fluid from the brake cylinder for preventing the operation of said valve device upon a reduction in brake pipe pressure to apply the brakes.

12. The combination with a fluid pressure brake, of a valve device for controlling a communication for venting air from the brake pipe and operating upon a predetermined reduction in brake pipe pressure for opening said communication and a second valve device also controlling said communication and adapted to open same only at a pressure higher than said predetermined pressure but adapted to close same only at a lower pressure and hold same closed until the brake pipe pressure has increased to a degree in excess of said predetermined degree of pressure.

In testimony whereof I have hereunto set my hand.

FRANK H. WHITNEY.

Witnesses:
E. H. DEWSON,
FREDERICK V. GREEN.

Copies of this patent may be obtained for five cents each, by addressing the "Commissioner of Patents, Washington, D. C."